(12) United States Patent
Heinen

(10) Patent No.: US 7,011,126 B2
(45) Date of Patent: Mar. 14, 2006

(54) PROGRESSIVE TIRE TREAD WEAR INDICATOR

(75) Inventor: Richard Heinen, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 181 days.

(21) Appl. No.: 10/688,727

(22) Filed: Oct. 17, 2003

(65) Prior Publication Data

US 2005/0081971 A1 Apr. 21, 2005

(51) Int. Cl.
*B60C 11/00* (2006.01)
*B60C 11/24* (2006.01)

(52) U.S. Cl. .............................. 152/154.2; 152/209.17; 152/209.21

(58) Field of Classification Search ............. 152/154.2, 152/209.17, 209.18, 209.21
See application file for complete search history.

(56) References Cited

U.S. PATENT DOCUMENTS

| | | | | |
|---|---|---|---|---|
| 2,706,509 A | * | 4/1955 | White | 152/154.2 |
| 5,980,668 A | * | 11/1999 | Slingluff | 152/154.2 |
| 6,523,586 B1 | | 2/2003 | Eromaki | 152/154.2 |
| 2001/0032691 A1 | * | 10/2001 | Ohsawa | 152/209.18 |
| 2002/0036039 A1 | | 3/2002 | Kazuhiro | 152/154.1 |
| 2004/0182487 A1 | * | 9/2004 | Lopez | 152/209.17 |

FOREIGN PATENT DOCUMENTS

| | | | |
|---|---|---|---|
| DE | 3627832 | * | 2/1988 |
| EP | 1066991 | | 1/2001 |
| FR | 2829970 | * | 3/2003 |
| JP | 10-76812 | * | 3/1998 |
| JP | 10-315711 | * | 12/1998 |
| JP | 2000-289414 | * | 10/2000 |
| WO | 0066372 | | 11/2000 |

* cited by examiner

*Primary Examiner*—Steven D. Maki
(74) *Attorney, Agent, or Firm*—Nancy T. Krawczyk

(57) ABSTRACT

A tire tread has at least one cavern formed in the sidewall of the traction elements of the tire. The cavern has a base with information therein to indicate the state of wear of the tire and a ceiling that is progressively worn away as the tread wears. Multiple caverns may be formed in the traction elements. If arranged in a series at progressively increasing or decreasing radial heights, the remaining tread life is communicated to an operator. If the caverns are located in different locations of the tread, relative wear patterns of the tire can also be indicated.

14 Claims, 7 Drawing Sheets

PROGRESSIVE TIRE TREAD WEAR INDICATOR

FIELD OF THE INVENTION

The present invention is directed to a tire tread including wear indicators.

BACKGROUND OF THE INVENTION

The use of treadwear indicators is not new and the use of treadwear indicators is mandated by law in many countries. A variety of such indicators are known. Once such type employs colored means, such as colored rubber or colored fibers, below the tread for a visual indicator of wear. Other types use tie-bar type elements in the tread grooves. When required by law, the upper surface of the tread wear indicator must be located at a height of 1.6 mm from the base of the groove in which the wear indicator is located.

The practical problem with the colored indicators of the type mentioned is that there is way for the operator to determine the level of wear until the tire is worn. When the tire employs the tie-bar type wear indicator, since the wear indicator is the same color as the remaining part of the tread, it can be difficult to determine the level of wear.

SUMMARY OF THE INVENTION

The invention is directed to a tire having wear indicators that assist the operator in determining the level of wear of a tire tread.

The invention is a tire tread for a vehicle tire. The tread has at least one tread element projecting from the base of the tread wherein the tread element has at least one radially extending side. The side of the tread element has a wear indicating cavern formed therein. The wear indicating cavern has a base located below the uppermost surface of the tread element when the tire is unworn.

In one aspect of the invention, the cavern has a base parallel to the uppermost surface of the element. The cavern may also have a roof that has a sloping configuration. The cavern may be formed in a variety of configurations. The configuration permits uniform wear of the cavern and slowly exposes information regarding the wear of the tread to the vehicle operator. The information regarding the wear of the tread is provided on the base of the cavern and may be in any form that communicates the tread wear to the user; i.e. it may be alpha-numeric, fractions, or symbols. The wear information may also be provided in colors.

In one aspect of the invention, the tread element is a circumferentially extending rib bounded by at least one circumferentially extending groove. In a tread having a rib, the caverns are formed to be open to the circumferentially extending groove. To allow for indication of the tread wear, the rib has a series of caverns formed therein. The caverns in the series are located at different radial heights along the rib side.

In another aspect of the invention, the tread element is a block formed by a plurality of circumferential and lateral grooves. The tread has multiple adjacent blocks wherein each block has a cavern therein. The caverns in adjacent blocks are located at different radial heights to indicate progressive tread wear.

Definitions

The following definitions are applicable to the present invention.

"Annular" means formed like a ring.

"Axial" and "axially" are used herein to mean lines or directions that are parallel to the axis of rotation of the tire.

"Circumferential" means lines or directions extending along the perimeter of the surface of the annular tire parallel to the Equatorial Plane (EP) and perpendicular to the axial direction.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "slot". The slot typically is formed by steel blades inserted into a cast or machined mold or tread ring therefor. In the appended drawings, slots are illustrated by single lines because they are so narrow. A "slot" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Lateral" means an axial direction.

"Leading" means a portion or part of the tread that contacts the ground first, with respect to a series of such parts or portions, during rotation of the tire in the direction of travel.

"Lugs" means discontinuous radial rows of tread rubber in direct contact with the road surface.

"Outer" means toward the tire's exterior.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Tie-Bar" means an extra thickness of rubber at the bottom of a slot such that, in the location where the extra rubber is present, the slot depth is less than the slot depth at all other locations. Tie-bars stabilize a lug by limiting the independent movement of two portions of a lug that are separated by slots, while traction properties that are inherent in the use of slots are provided.

"Trailing" means a portion or part of the tread that contacts the ground last, with respect to a series of such parts or portions during rotation of the tire in the preferred direction of travel.

"Tread" means a molded rubber component which, when bonded to a tire casing, includes that portion of the tire that comes into contact with the road when the tire is normally inflated and under normal load.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
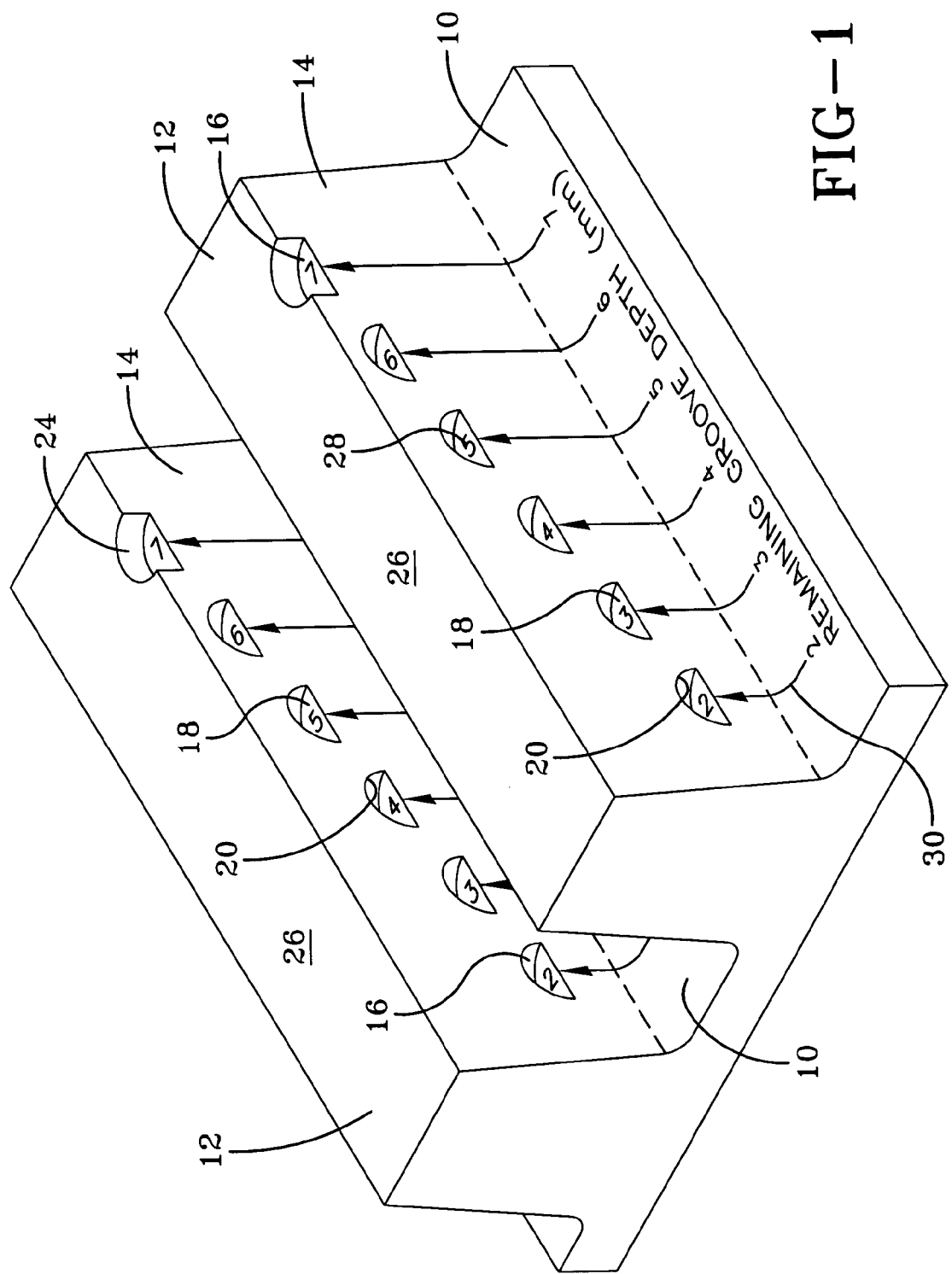
FIG. 1 illustrates a portion of a ribbed tire tread.

A portion of a tire tread is illustrated in FIG. 1. The tread is characterized by at least one circumferentially extending groove 10 and adjacent ribs 12. Each rib 12 has at least one radially extending sidewall 14 that faces the circumferential groove 10. Those skilled in the art will appreciate that the tire tread may have more than one circumferential groove 10 and multiple continuous or non-continuous ribs 12.

Figure 2:
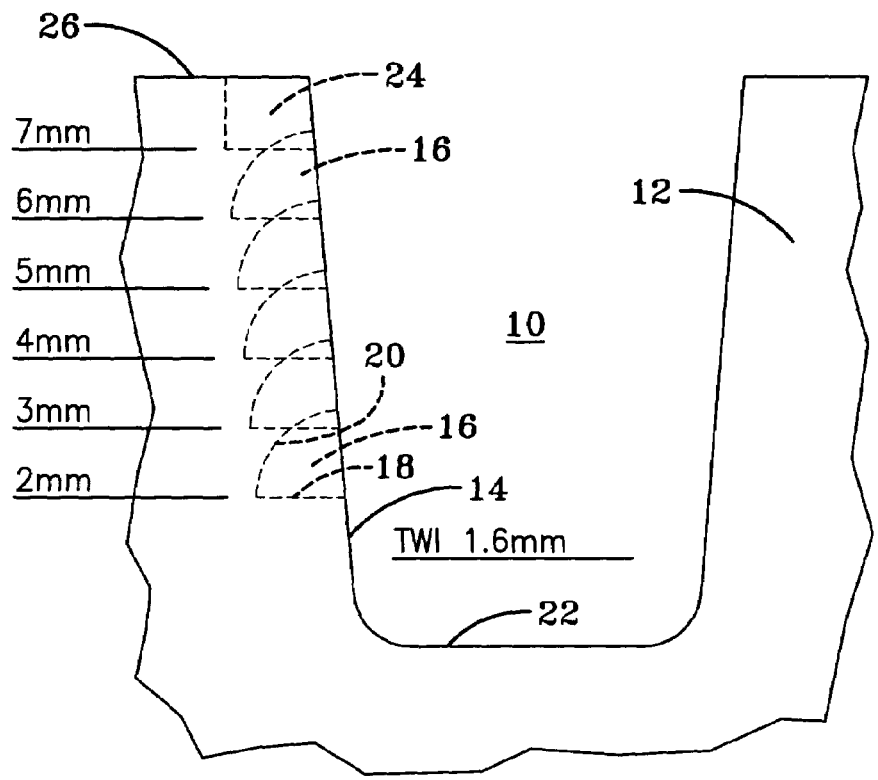
FIG. 2 is a cross sectional view of the ribbed tire tread along line 2—2 of FIG. 1.

Located in the rib sidewall 14 is at least one tread wear indicating cavern 16. The cavern 16 is defined by a base 18 that is a radially inner surface parallel to the outer surface of the rib 12 and a ceiling 20 that is a radially outer surface that connects with the cavern base 18. The cavern 16 is spaced from the groove base 22 by a predetermined height, see FIG. 2. The rib 12 has a series of adjacent caverns 16, arranged in a predetermined sequence. Herein illustrated, the adjacent caverns 16 are arranged in sequentially descending heights along the rib sidewall 14.

When the tire is unworn, the uppermost cavern 24 is open to the tread surface 26 and the operator can locate the first wear indicator 16. The adjacent caverns 16 are preferably radially overlapping, see FIG. 2. The slight overlapping of the adjacent caverns 16 assures that as the tire is wearing, the next cavern 16 appears as the preceding cavern 16 disappears. The overlapping provides the operator with continuous knowledge as to the level of tire wear.

At the base 18 of the cavern 16 is an indicator 28 that informs the operator of the wear condition of the tread. As illustrated, the indicator 28 is a number corresponding to the height, in mm's, of the cavern base 18 as measured from the groove base 22. The indicator 28 may also be presented as a fraction, such as ⅞, ½, ¼, indicating the wear percentage of the tread, expressed relative to the original tread depth. Alternatively, any other symbol easily interpreted by the operator may be employed; such as a go, caution, and stop signs. The size of the indicator 28 has a maximum dimension of 2 to 6 mm, preferably 3 to 4 mm.

In the illustrated tread of FIG. 1., the caverns 16 are sequentially number from 2–7. Each number is the remaining tread depth in mm's. Adjacent to the caverns 16, and located in the adjacent groove 10, may be markings 30 that indicate the significance of the indicators 28 in the cavern base 18. Such markings 30 may be absent from narrow grooves.

To increase visibility of the wear indicating caverns 16, the selective use of color may be employed. The indicators 28 on the cavern base 18 may be made in a color contrasting with the tread color, for example, green, yellow, and red—colors internationally known for go, caution, and stop. The cavern base 18 itself may be formed in the contrasting color. While more complex to manufacture, the entire inside of the cavern 16 may be lined or formed in a contrasting color to emphasize the presence of the cavern 16. Any markings 30 placed in the adjacent groove 10 may be provided in color. Additionally, the groove markings 30 may be presented in a raised or indented format, making accidental destruction of the groove markings 30 due to stones and other abrasive elements that enter the groove 10 less likely during normal tire use.

Figure 3A:
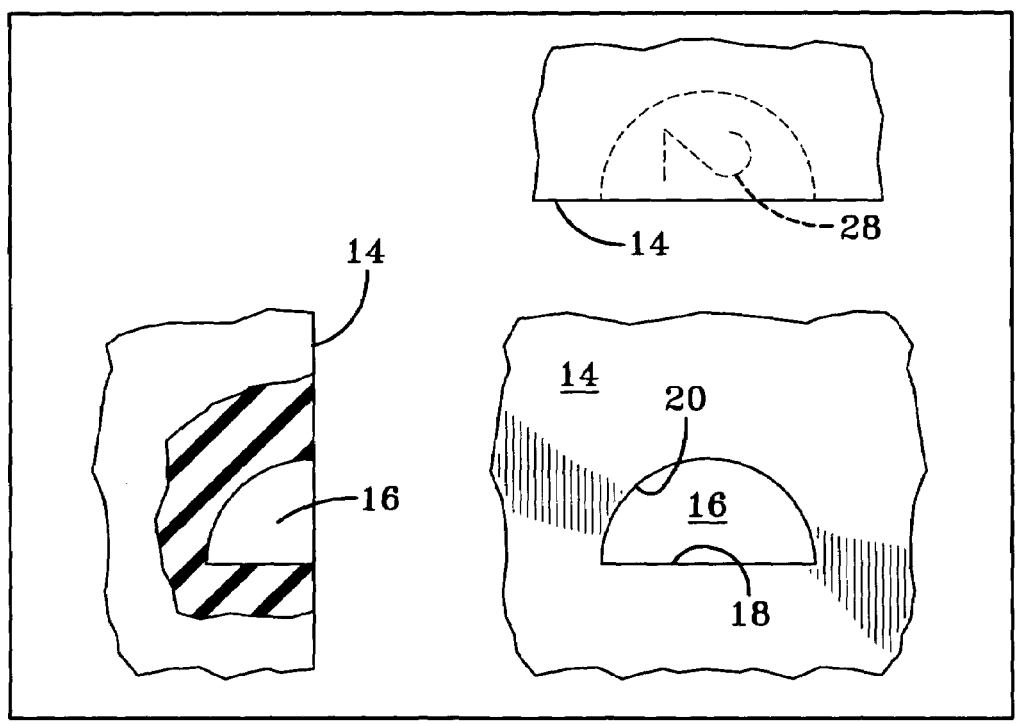
FIGS. 3A–3E are various embodiment of the wear indicator cavern.
Figure 3B:
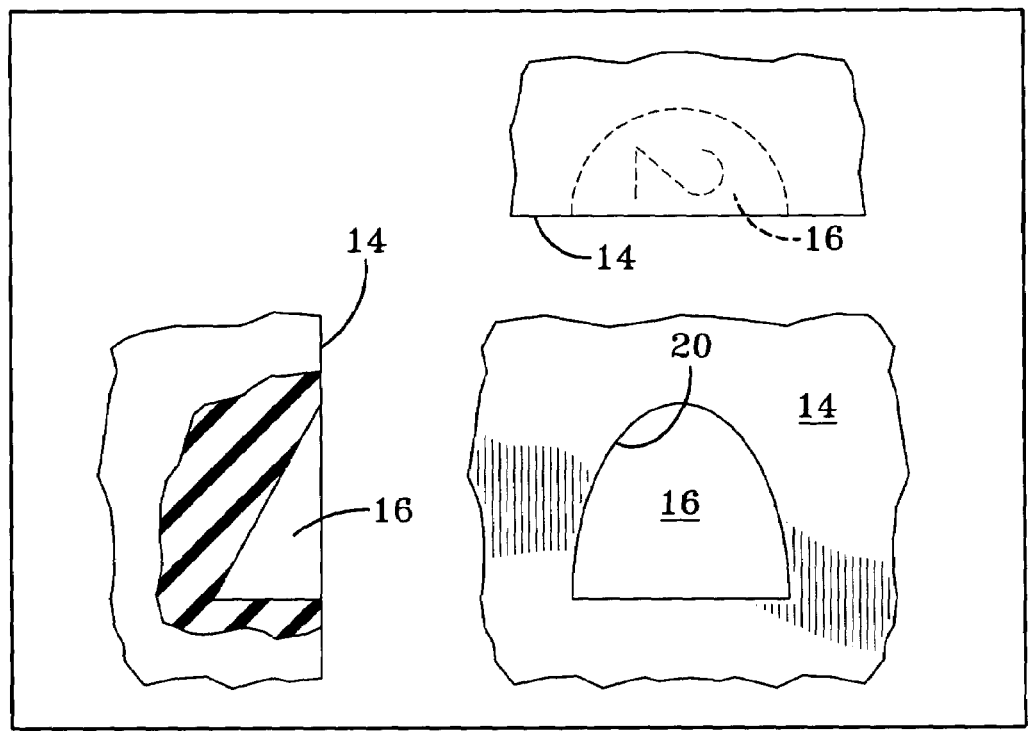
Figure 3C:
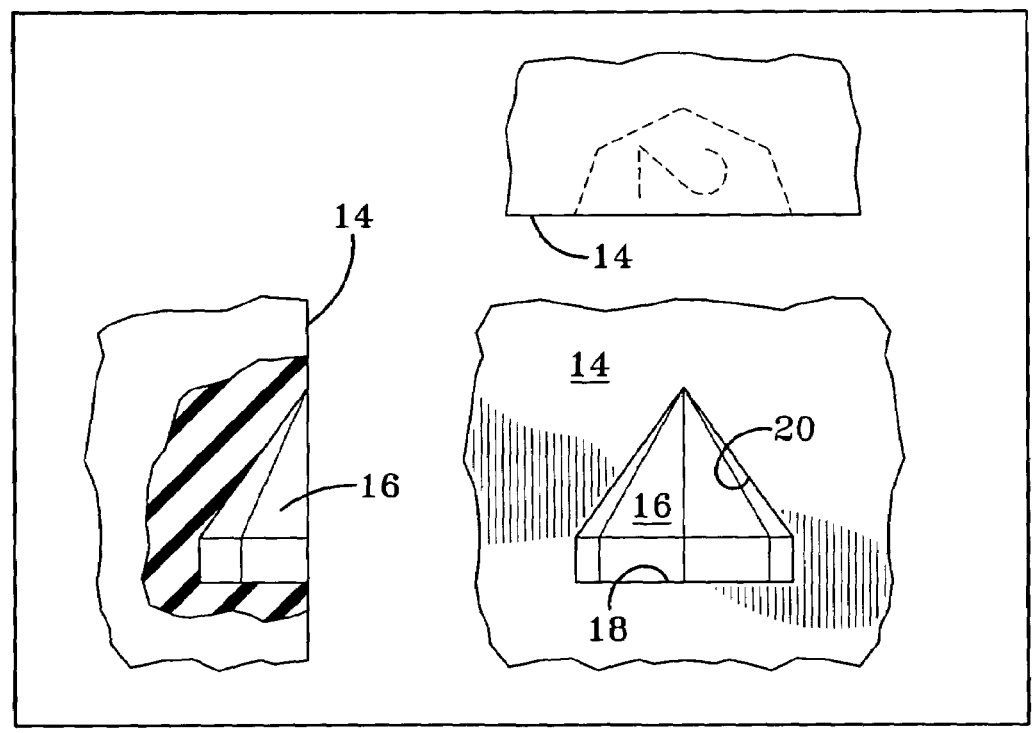
Figure 3D:
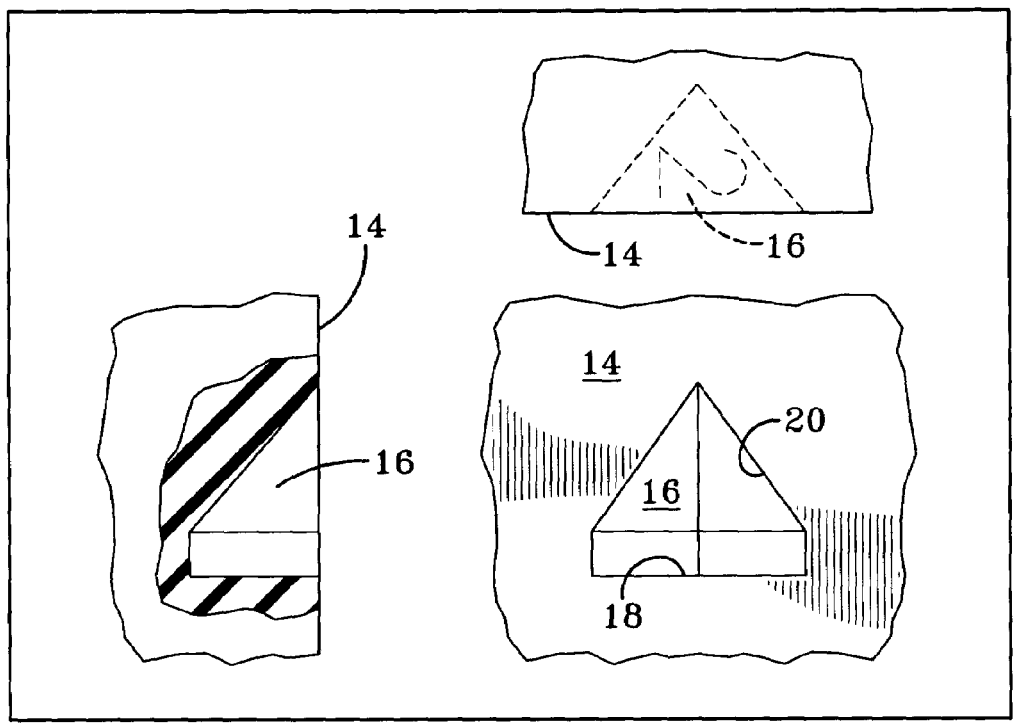
Figure 3E:
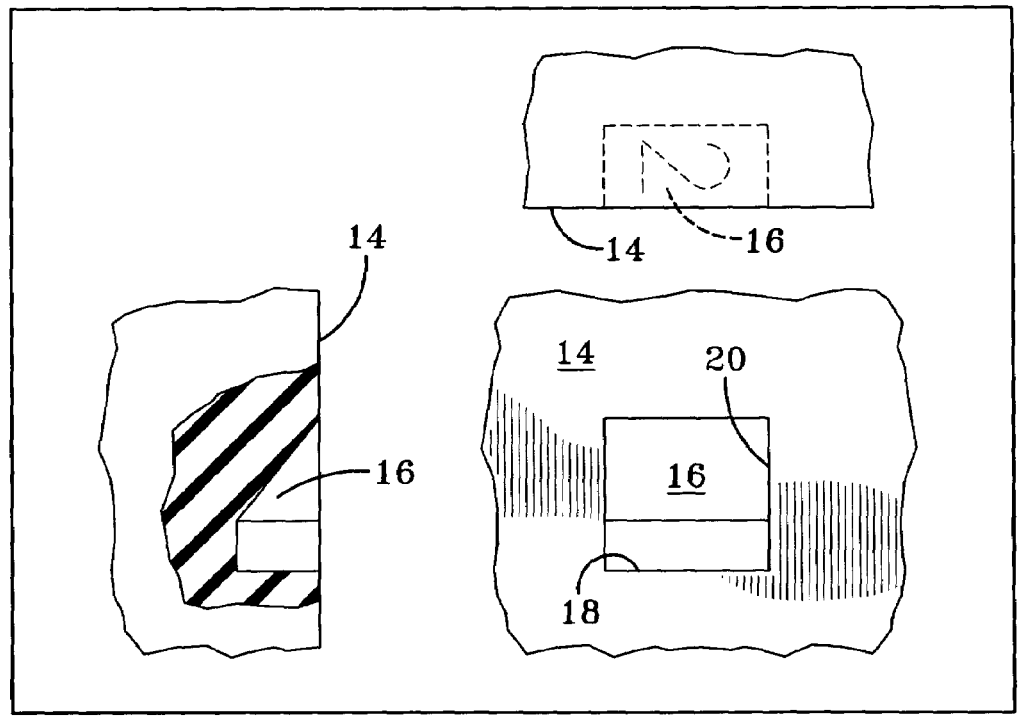

FIGS. 3a–3e illustrate a plurality of cavern configurations. Each FIG. shows a top view, cross section side view, and front view of the caverns 16. The cavern 16 of FIG. 3a has a quarter spherical shape, with the cavern ceiling 20 gradually sloping upwards to a maximum height at the cavern opening in the tread element sidewall 14. The cavern 16 of FIG. 3b has a conical shape, with the ceiling 20 have a constant slope to a maximum height and a tall opening. The cavern 16 of FIG. 3C is diamond shaped with the ceiling 20 formed in multiple sections, joining at the maximum height; the opening being diamond shaped. The cavern 16 of FIG. 3D is pyramidal shaped, formed from two sections, sloped to meet at the maximum height with a triangular opening. The cavern 16 of FIG. 3E is square shaped with a square opening.

A series of caverns 16 may be located in any position of the tread, either in center ribs, shoulder ribs, or in ribs located between the center and shoulder ribs. A series or individual wear indicator caverns 16 may be located in several positions across the width of the tread, providing information regarding the wear pattern of the tire. For example, if the wear indicator caverns 16 are located in the center and the shoulders, if the wear indicators caverns 16 show a lower number in one shoulder than the wear indicators caverns 16 in the opposing shoulder, than the wear is uneven across the tire.

Ideally, the series of caverns are located in multiple locations about the circumference of the tire tread. A minimum of two series of caverns 16 would be desired, with the maximum number of series in a tire tread optimized due to the cavern size and maintaining the tread pattern and tread performance characteristics.

Figure 4:
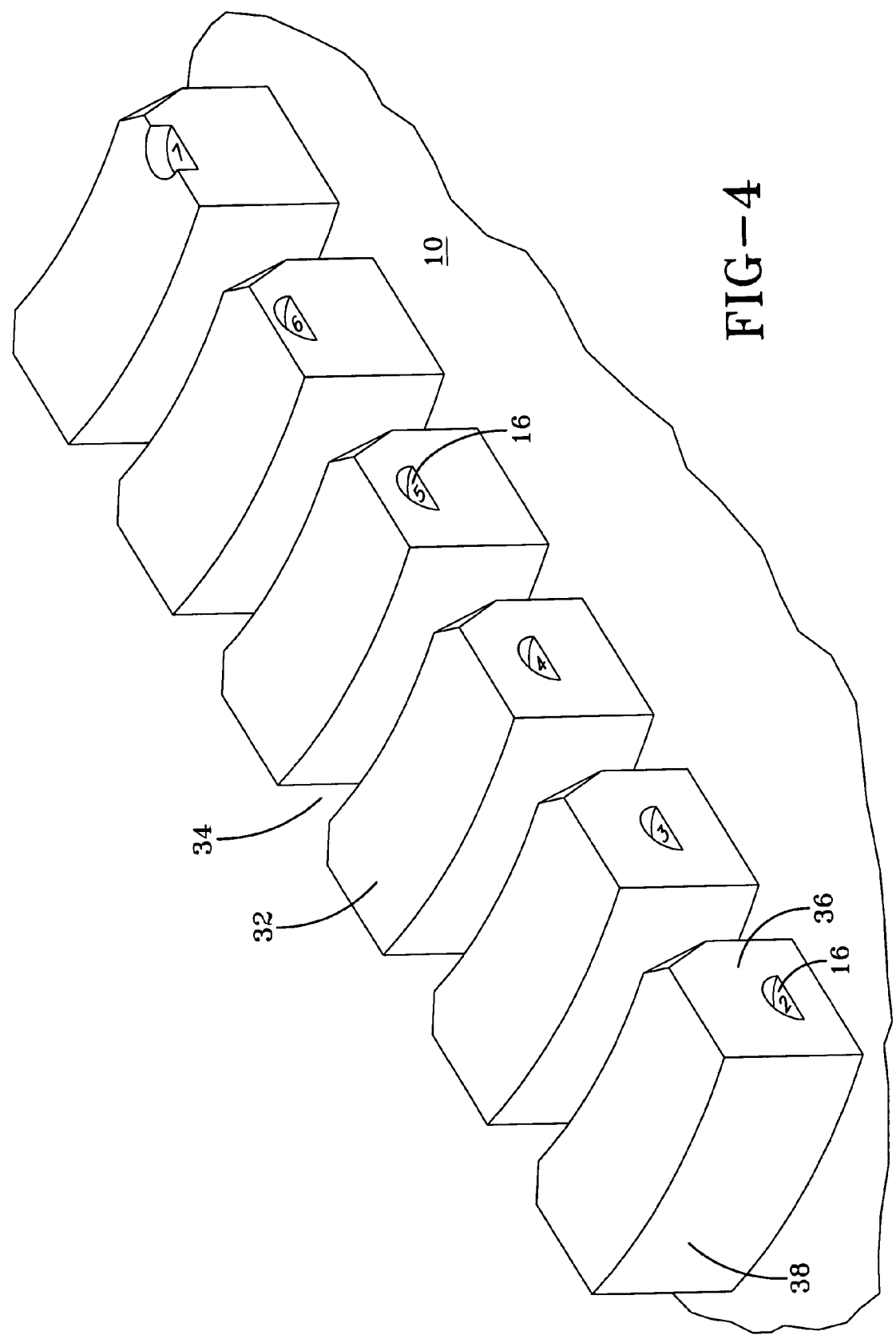
FIG. 4 illustrates a portion of a block tire tread.

FIG. 4 shows an alternative embodiment employing the tread wear indicator caverns 16. A portion of a tread is shown, the tread having a plurality of blocks 32. The blocks 32 are delineated by circumferential grooves 10 and lateral grooves 34 inclined at angles relative to each other. The blocks 32 may have any overall configuration desired by the tread designer. The sole requirement in accordance with the present invention is that the blocks 32 have radially extending sidewalls 36, 38.

Located in one sidewall 36 of one of the tread blocks 32 is a tread wear indicator cavern 16. At least one adjacent block 32 also has a wear indicator cavern 16, the adjacent cavern 16 being located at a different radial height than the first cavern 16. When aligned, the result is a series of wear indicator caverns 16 arranged at gradually ascending or descending radial heights. As previously discussed, the base 18 of the caverns 16 are marked in a manner so as to indicate the wear level of the tire and the adjacent groove 10 may be marked to highlight the presence of the caverns 16.

Figure 5:
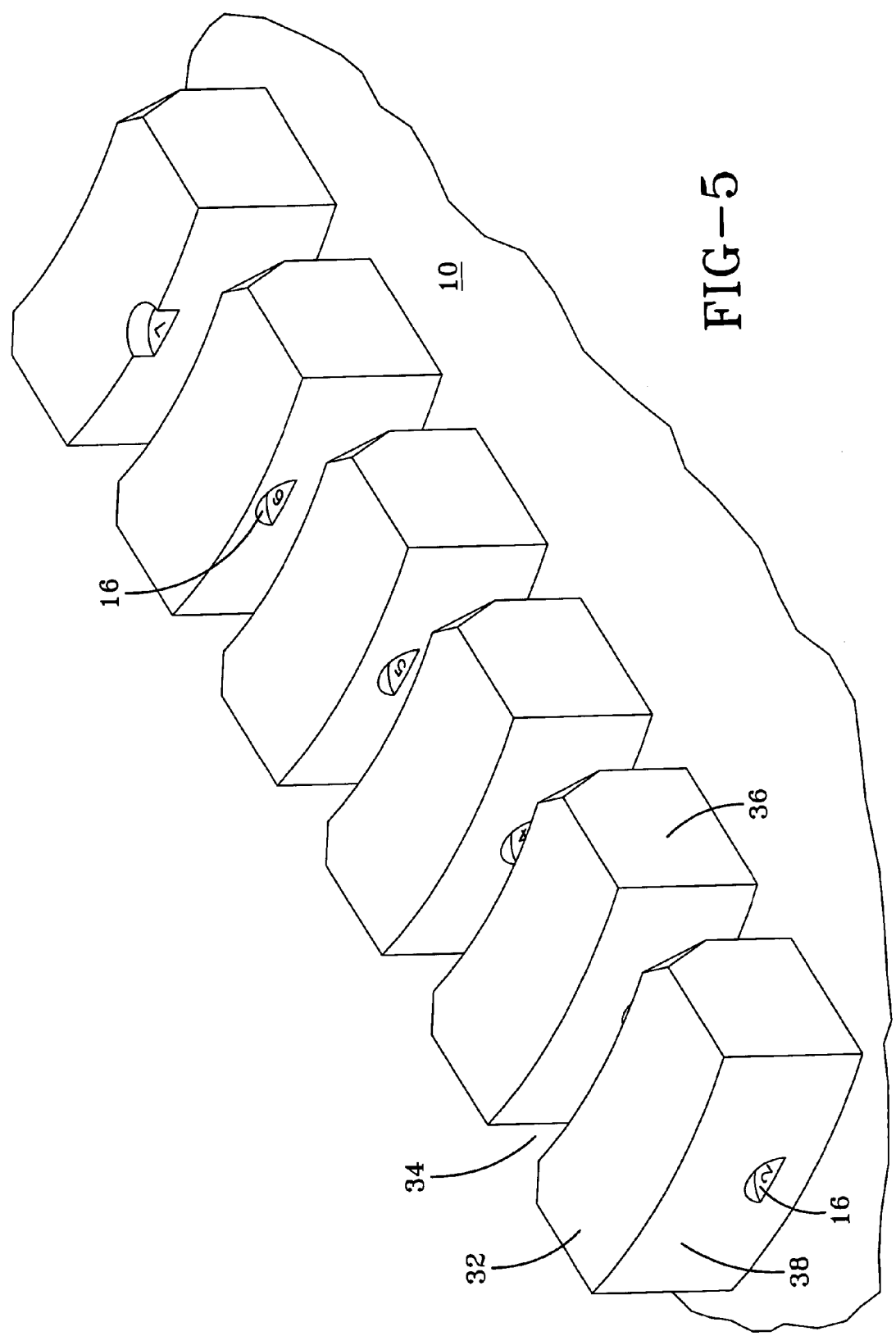
FIG. 5 illustrates a portion of another block tire tread.
Figure 6:
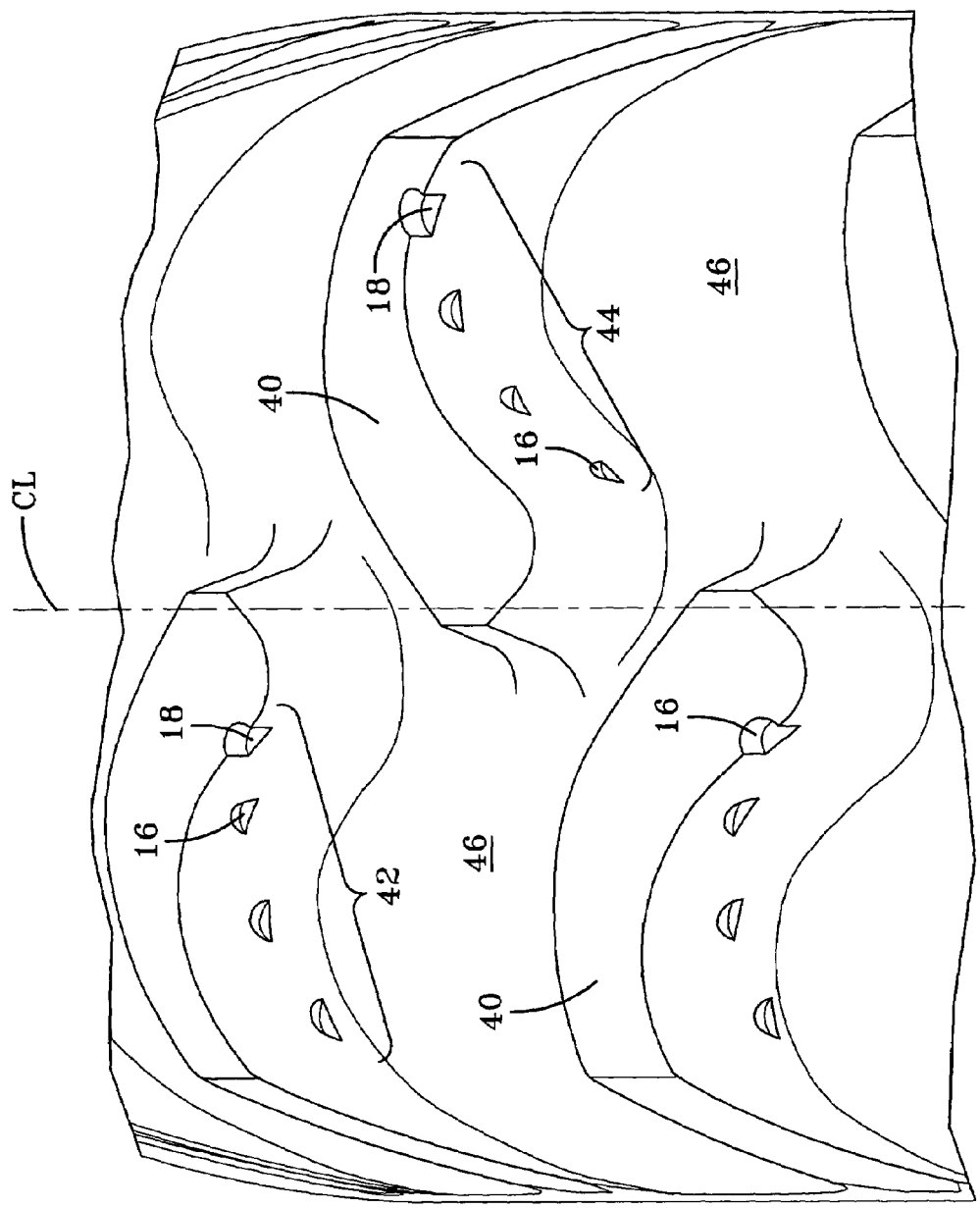
FIG. 6 illustrates a portion of a lugged tire tread.

Also, when forming the caverns 16 in blocks 32, the caverns 16 may be formed in either leading or trailing sidewalls 38 of the blocks, see FIG. 5. At least two caverns 16 form this series of wear indicators. The caverns 16 are located at different radial heights and are also provided with marks 28 to indicate the wear level. When the caverns 16 are formed in either the leading or trailing sidewall 38 of the block 32 in conjunction with a series formed elsewhere, either in the trailing or leading sidewall 38 or along the circumferential sidewalls 36 of the blocks 32, then determinations can be made regarding the wear pattern across the tread. Forming caverns 16 in both the leading and trailing sidewalls provides heel-and-toe wear information.

Wear indicators 16 located in the leading or trailing sidewalls 38 may also be located in axially adjacent tread blocks 32, or if the tread pattern is an off-the-road or agricultural tread, the wear indicators 16 may be formed in axially extending lugs 40, either the leading or trailing edges, see FIG. 7. Each series of caverns 16 may be identically arranged, or arranged in a manner to provide additional information regarding wear across the tread width. This is illustrated in the tread of FIG. 7. In a first series 42 of wear indicators 16, the indicator 16 closest to the centerline CL of the tread has a base 18 at the greatest radial height from the tread base 46. A second series 44 of wear indicators 16, located on the opposing tread half from the first series 42, is formed such that the cavern 16 with the greatest radial height from the tread base 46 is located farthest from the centerline CL. No matter what type of tread configuration is employed, or the intended use of the tread, the wear cavern indicators can be employed.

Regardless of what tread pattern is employed and where and how in the tread the wear cavern indicators 16 are used, the number of wear cavern indicators 16 in a single series should be at least three. Three indicators 16 will indicate the unworn tread, a mid-wear level of the tread, and a worn tread. The actual number used may be based on the percentage of remaining tread depth it is desired to communicate to the operator, i.e. one/half, two/thirds, three/fourths, or the actual depth in millimeters of tread remaining.

What is claimed is:

1. A tire tread for a vehicle tire, the tread having at least one tread element projecting from the base of the tread, the tread element having at least one radially extending side,
    wherein the side of the at least one tread element has a cavern formed therein, the cavern having a roof and a base located below the uppermost surface of the tread element when the tire is unworn, the cavern base being parallel to the uppermost surface of the tread element and an indicator being provided on the cavern base to indicate the state of wear of the tread, the indicator being in the form of a number, a numerical fraction, or a symbol having a shape indicating the state of wear of the tread.

2. The tread of claim 1 wherein the cavern roof has a sloping configuration.

3. The tread of claim 1 wherein the tread element is a circumferentially extending rib bounded by at least one circumferentially extending groove forming the side of the rib, and the cavern in the side of the tread element opens to the circumferentially extending groove.

4. The tread of claim 3 wherein the rib has a series of caverns formed in the side of the rib, the caverns in the series being located at different radial heights along the rib side.

5. The tread of claim 1 wherein the tread element is a block formed by a plurality of grooves, the tread comprising multiple adjacent blocks wherein each block has a cavern therein and the caverns in adjacent blocks are located at different radial heights.

6. The tread of claim 1 wherein the cavern is located on the leading edge of the tread element.

7. The tread of claim 1 wherein the cavern is located on the trailing edge of the tread element.

8. The tread of claim 1 wherein the indicator is made in a color contrasting with the tread color.

9. A tire tread for a vehicle tire, the tread having a plurality of tread elements, the tread elements having radially extending sidewalls,
    the tread being characterized by at least one series of adjacent caverns formed in a sidewall of one of the tread elements or sidewalls of the tread elements, each cavern in the series having a roof and a cavern base parallel to the uppermost surface of the tread element and an indicator being provided on the cavern base to indicate the state of wear of the tread, the indicator being in the form of a number, a numerical fraction, or a symbol having a shape indicating the state of wear of the tread, wherein the base of each of the adjacent caverns in the series is located at a different radial heights.

10. The tread of claim 9 wherein the tread elements are circumferentially extending ribs and the adjacent caverns are formed in a sidewall of one of the ribs.

11. The tread of claim 9 wherein the tread elements are multiple tread blocks and one cavern in the at least one series is formed in a single tread block, the adjacent caverns of the at least one series being formed in adjacent tread blocks.

12. The tread of claim 9 wherein each cavern in the at least one series radially overlaps the cavern adjacent to it.

13. The tread of claim 9 wherein the tread elements are sloped lugs and the at least one series of caverns is located on the leading edge of the lugs.

14. The tread of claim 9 wherein the indicator is made in a color contrasting with the tread color.

\* \* \* \* \*